US005529762A

United States Patent [19]
Alexander

[11] Patent Number: 5,529,762
[45] Date of Patent: Jun. 25, 1996

[54] METHOD FOR POLLUTION EMISSION REDUCTION FROM GLASS MELTING FURNACES

[75] Inventor: Jeffery C. Alexander, Newbury, Mass.

[73] Assignee: Edmeston AB, Västra Frölunda, Sweden

[21] Appl. No.: 449,735

[22] Filed: May 25, 1995

Related U.S. Application Data

[63] Continuation of Ser. No. 998,035, Dec. 29, 1992, abandoned, which is a continuation-in-part of Ser. No. 945,721, Sep. 21, 1992, abandoned.

[51] Int. Cl.$^6$ .............................. B01N 8/12; C01B 17/56
[52] U.S. Cl. .............................. 423/244.07; 95/68; 95/69; 65/27
[58] Field of Search .................. 423/243.08, 244.07, 423/244.08; 95/52, 68, 69; 65/27

[56] References Cited

U.S. PATENT DOCUMENTS

| | | | |
|---|---|---|---|
| 3,728,094 | 4/1973 | Bowman | 65/27 |
| 4,144,359 | 3/1979 | Zahedi et al. | 427/39 |
| 4,308,036 | 12/1981 | Zahedi et al. | 55/6 |
| 4,338,113 | 7/1982 | Hohman et al. | 65/27 |
| 4,374,652 | 2/1983 | Zahedi et al. | 55/6 |
| 4,505,723 | 3/1985 | Kahedi et al. | 55/117 |
| 4,542,000 | 9/1985 | Alexander et al. | 423/244 |
| 4,600,568 | 7/1986 | Yoon et al. | 423/244.07 |
| 4,668,489 | 5/1987 | Alexander et al. | 423/240 |

OTHER PUBLICATIONS

Miller et al, "Batch Pretreatment Process Technology . . . ", U.S. Environmental Protection. Agency Report No. EPA/600/2–85/073, National Technical Information Service, 1985 *no month available.

"Inka Emission Control", Edmeston GmbH, published before Sep. 21, 1991.
Sakhuja et al, "Fluidized Beds for Glass Batch Preheating", 41st Conf. on Glass Problems. Nov. 18–19, 1980.
Leimkühler, "The preheating of raw material for glass furnaces", Glass Technology 1989.
Larsson, "Particulate emission control and raw material preheating", Edmeston AB, Summer 1992 *no month available.
"The Edmeston Emission Control System", Edmeston GmbH, published before Sep. 21, 1991.
Holmund, "Process Description: FLÄKT Flue gas cleaning plant for . . . ", Fläkt, 1988.
"EFB System for Glass Furnace Particulate Emission Control", Edmeston Materials System Engineering, published before Sep. 21, 1991.

*Primary Examiner*—Gary P. Straub
*Attorney, Agent, or Firm*—Burns, Doane, Swecker & Mathis

[57] ABSTRACT

A method for reducing pollution emissions from a glass melting furnace using electrostatic granular bed (EGB) technology is disclosed. In one embodiment, sorbent dust containing an alkaline earth metal material, e.g., calcium, is injected into a prereactor for reaction with furnace exhaust gases. A layer of calcium material forms over the granules. These granules are co-mingled with granules from an EGB filter which, over a period of time, retain a layer of low resistivity alkali metal salt. The resulting mixture of granules maintains a high resistivity and therefore prolongs the life of granules used in the EGB filter. In an alternative embodiment, the granules in the EGB filter are themselves formed from an alkaline earth metal material. The granules react with sulfur compounds in the exhaust gas and form a layer of alkaline earth metal sulfates and sulfites in the granules. Simultaneously alkali metal-containing particles are deposited on the granules. The accumulated layers of pollutants are easily removed by mechanical agitation.

6 Claims, 5 Drawing Sheets

CaCO₃ Granule

METHOD FOR POLLUTION EMISSION REDUCTION FROM GLASS MELTING FURNACES

CROSS-REFERENCE TO RELATED APPLICATION

This application is a continuation of application Ser. No. 07/988,035, filed Dec. 29, 1992 now abandoned, which is a continuation-in-part of application Ser. No. 07/945,721, filed Sep. 21, 1992 now abandoned.

BACKGROUND OF THE INVENTION

The manufacture of glass involves the heating of glass batch materials to high temperatures (approx. 1500° C.) in order to melt and homogenize the various constituent components. This process is generally carried in furnaces heated directly by the combustion of some sort of fossil fuel. By far, the most common type of glass manufactured is termed soda-lime glass, used for windows, tableware, bottles, etc. This glass is characterized by its batch material, consisting primarily of silica sand, limestone, soda ash and salt cake. The present invention is concerned primarily with this glass type, but other glass types, such as borosilicate, alumina-silica, lead, etc., also lie within the scope of the invention.

Particulate emissions from glass furnaces consist primarily of submicron condensates of alkali metal sulfates that result from a combination of a gas such as sulfur oxide and an alkali metal such as sodium. To a lesser extent, potassium is also present in furnace exhaust gases. Collection and handling of these particulates is made difficult because of their low bulk density, hygroscopic tendency, and acidic potential. The gaseous emissions of primary concern are sulfur oxides. These are derived primarily from sulfur materials added with the glass batch (salt cake) and from sulfur in the fossil fuel used to heat the furnace. The bulk of the emissions are in the form of $SO_2$, but a significant portion are in the form of $SO_3$. Other pollutants which may be present depending upon the specific glass type are boron, fluorine, chlorine, and lead oxide dust. Reduction of all these emissions are being mandated by increasingly stringent government regulations.

A recent development in pollution control is electrostatic granular bed filter (EGB) technology, as exemplified by U.S. Pat. No. 4,338,113. Pollutants are adhered to electrically charged granular material as exhaust gases pass over the granules.

This technology has been found to be very effective in removing pollutants. However, a problem occurs in that over a period of time, the conductivity of the granules increases, which correspondingly decreases their ability to trap pollutants. This greatly reduces the useful life of the granules and necessitates down time to replenish the granular bed with fresh material. Hence, while EGB technology provides effective pollution abatement, there remains a need in the art for prolonging the useful life of granules used in EGB technology.

SUMMARY OF THE INVENTION

It is accordingly an object of the invention to provide a method for reducing pollution emissions from a glass melting furnace exhaust stream using electrostatic granular bed filter technology.

It is another object of the invention to provide a method, as above, which prolongs the useful life of granules used in the electrostatic granular bed filter by maintaining a high electrical resistivity in the granular bed over a long period of time.

These objects are achieved by, in a first embodiment, an electrostatic granular bed filter process in which an exhaust stream from a glass melting furnace is injected with a sorbent dust or powder having high resistivity and then is passed over a moving bed of granules in a prereactor. The dust or powder, for example, an alkaline earth-containing component, reacts with sulfur in the exhaust stream to form the corresponding sulfate or other salt which is deposited on the granules, forming a layer thereon. The exhaust stream is then routed to an electrostatic granular bed filter containing granules similar to those in the prereactor. Sodium sulfate and/or other salts formed from the exhaust gases are deposited on the granular bed of the EGB filter, forming a layer thereon.

Periodically, the two granular beds are randomly mixed together and granules from the mixture are returned to the prereactor and the EGB filter. Thus, over time the granules in the EGB filter contain a mixture of high resistivity compounds as well as salts having low resistivity formed from the exhaust gases. The presence of the high resistivity salts prevents a decrease in resistivity of the EGB bed.

In another embodiment of the invention, the granules are comprised of an alkaline earth metal material. Thus, the granules themselves react with $SO_3$ and $SO_2$ gases in the exhaust stream, thereby obviating the need for a separate prereactor. Simultaneously, $NaSO_4$ and other alkali metal salts are electrostatically deposited on the granules. Because the molar volume of alkaline earth metal sulfates and sulfites is greater than that of the alkaline earth metal oxide, hydroxide, or carbonate granules, the sulfates and sulfites are easily removed along with the deposited alkali metal sulfates and sulfites. Various mechanical agitation methods can be used to remove the deposited material. The thus-cleaned alkaline earth metal granules, having a high resistivity, can be reused.

BRIEF DESCRIPTION OF THE DRAWINGS

For a full understanding of the invention, the following detailed description should be read with reference to the drawings, wherein.

DETAILED DESCRIPTION OF THE PREFERRED EMBODIMENTS

The present invention resolves the problem of low granule electrical resistivity in EGB filters due to the formation of low resistivity layers, and also results in a system that simultaneously reduces pollutants such as $SO_2$ and $SO_3$.

Figure 1:
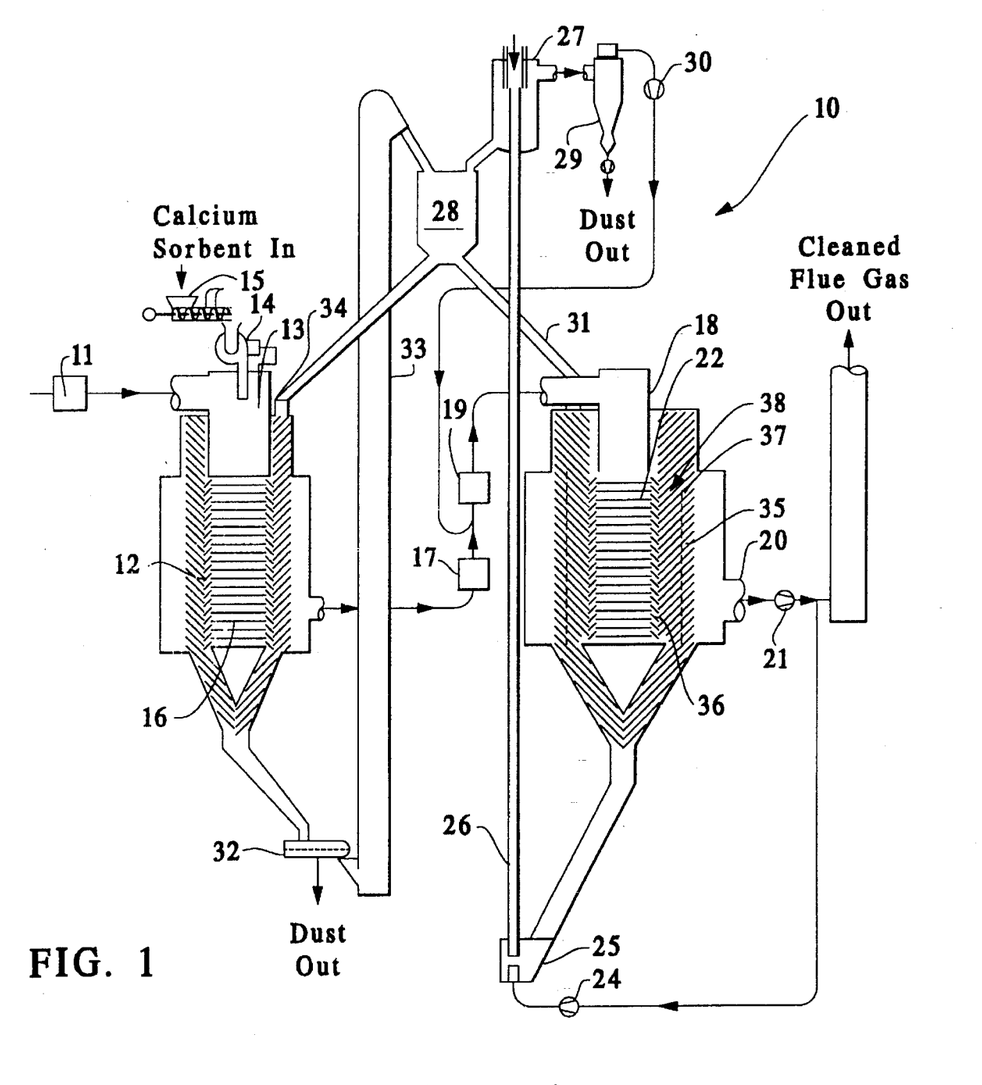
FIG. 1 is a schematic view of a first embodiment of the invention.

In a first preferred embodiment, as shown in FIG. 1, an electrostatic granular bed filter apparatus is indicated generally by the number 10. Exhaust gases from the glass melting furnace and from the regenerator or recuperator (not shown), are first passed through a gas cooling unit 11 using water injection. Water evaporation cools the gases to the desired range, generally from about 150° C. to about 500° C., preferably from about 400° to about 450° C. The gases then enter a prereactor moving bed unit 12 which is a circularly symmetric cylindrical bed of durable granules moving downward by gravity. Gas flows through the bed in a horizontal, radially outward direction. A suitable alkaline earth metal based dust or powder is air injected into the inner region 13 of the prereactor via an injection blower 14. Suitable alkaline earth metal materials are CaO, $Ca(OH)_2$, $CaCO_3$, MgO, $Mg(OH)_2$, $MgCO_3$, etc. Other high resistivity materials can also be used, such as $SiO_2$, $Al_2O_3$ and the various ferrous oxides, however, these latter materials are less preferred because they do not react with sulfur compounds in the prereactor. The dust or powder is metered into the injection blower 14 by a feeder 15. The dust or powder is injected into the prereactor in sufficient quantities so that $SO_3$ in the flue gas will be neutralized and form the corresponding sulfate (e.g. $CaSO_4$). Generally, the amount of dust or powder injected is based on the stoichiometric ratio of the alkaline earth metal to sulfur in the exhaust gases. The ratio can vary from about 0.5 to about 4.0, and preferably from about 1.0 to about 2.0. Additional alkaline earth metal may be injected so that $SO_2$ will be reacted to form the corresponding sulfite. These reactions will take place somewhat when the powder is initially contacted with the flue gas in the inner region 13 of the prereactor 12, but primarily in the prereactor bed 12 itself where the alkaline earth metal has been deposited onto the granule surface.

Granules are moved through the prereactor bed 12 at sufficient velocity so that the injected powder will not cause unstable increases in flue gas pressure drop. Cleaned granules are supplied at the top of the moving bed, while granules with collected powder are removed at the bottom.

Flue gases leave the prereactor 12 and may pass through a second gas cooling unit 17 where gases are cooled by water injection and evaporation. This step may be required if it is desired to operate the electrostatic granular bed filter 18 at a temperature different from the prereactor bed 12. Gases are then passed through an electrostatic preionizer 19 where a corona discharge is formed in the gas by applying a high voltage to a cathode electrode (not shown). The ions in the corona attach to the dust particles in the gas and give them a net electric charge.

Gases carrying the charged dust particles are then passed through the electrostatic granular bed filter 18 which includes a durable granular media 35 retained between electrically grounded perforated or louvered structures 36 and 37. A high voltage electrode 38 inside the bed electrically polarizes the granules. Charged dust particles in the gas are attracted to and are deposited onto the surface of the granules. Cleaned gas exits the filter via outlet 20 and a fan 21 is used to provide the underpressure to draw the gases through all the previously mentioned equipment. Gases are then exhausted to the atmosphere.

Granules in the filtration bed 22 of the filter 18 are either periodically or continuously moved through the bed by gravity, the frequency or rate of motion determined by necessity to maintain stable gas pressure drop across the filter. Granules are then cleaned of dust externally and returned to the filter 18. The embodiment of FIG. 1 illustrates a pressure blower 24 to draw a relatively small portion of the cleaned flue gases from the discharge of the fan 21. Pressurized gases are directed through the venturi ejector 25 which includes an opening in the venturi nozzle to allow granules from filtration bed 22 to flow into the pressurized gas stream in pipe 26. These granules are then pneumatically conveyed through pipe 26 and in the process, dust is removed from the granules and entrained in the conveying gas. The granules are separated from the gas in the separation chamber 27 and fall by gravity into charge hopper 28. Conveying gases and entrained dust are directed to cyclone 29 or equivalent separator where dust is inertially separated. Underpressure to pull gases through the cyclone is provided by cyclone fan 30 and gases are returned to the main flue gas stream at some suitable point, preferably upstream of electrostatic preionizer 19. In this way, any residual dust in the conveying gas will be captured in the filtration bed 22. Cleaned granules are returned from the charge hopper 28 to the filtration bed 22 by gravity flow through infeed pipe 31.

Granules from the prereactor bed 12 are also cleaned and recycled. However, the rate of granule cleaning from this bed will be significantly greater than that for filter bed 22, due to the fact that typically, the amount of high resistivity material injected into the prereactor 12 is several times greater than the rate of dust collection in the filter bed 22. In a preferred embodiment, a mechanical screen 32 is used to separate dust from granules and a bucket elevator 33 is used to lift the granules. Granules are discharged from the bucket elevator into charge hopper 28 and are returned to prereactor bed 12 via infeed pipe(s) 34. The cleaned granules from filter module 18 are co-mingled with cleaned granules from prereactor bed 12 before they are respectively reintroduced to the beds. This is conveniently done by utilization of one charge hopper for both beds.

The granule bed of the prereactor is from about 0.1 to about 0.3 meters thick and the bed of granules in the EGB filter is between about 0.5 and about 1.0 meters thick. The granule migration velocity in the prereactor is from about 10 to about 100 meters/hr while that in the EGB is from about 0.2 to about 2 meters/hr.

The granules are co-mingled because it has been found that if granules utilized in filter bed 22 of module 18 for capture of sodium sulfate ($Na_2SO_4$) dust particles are subsequently utilized in prereactor bed 12 for capture of CaO (lime) or other high resistivity materials and subsequently reacted with $SO_3$ (and possibly $SO_2$) to form $CaSO_4$ dust, then the solid layer formed on the granule surface will be a mixture of $NaSO_2$ and $CaSO_4$ (or other alkaline earth metal sulfate). The resulting electrical resistivity of the coated granule will be a factor of ten to a hundred times greater than that exhibited when a relatively pure coating of $Na_2SO_4$ is allowed to form, as would be the case if granules were not co-mingled. This then allows the economical application of a voltage to the filter bed which in turn produces polarization of bed granules and efficient capture of submicron dust particles.

In order for the EGB filter technology to properly function, a high voltage must be maintained between the high voltage electrode 38 and the grounded inner louvers 36 and grounded outer louvers 37, the space between the electrode 38 and the louvers 36 and 37 being filled with granular media. Generally, the electric field strength between the electrodes must be a minimum of $5 \times 10^4$ volts/meter for effective operation. The granular media is chosen to have good electrical insulating properties, so that excessive electrical power is not required to maintain this high voltage. For typical design parameters, a bulk electrical resistivity of at least $1 \times 10^6$ ohm-m is required for effective operation. During operation of the EGB Filter, particulate pollutants are deposited onto the surface of the granules and the electrical insulating properties of the granule/dust mixture can be different from that of the clean granules. In fact, sodium sulfate exhibits electrical resistivity substantially lower than that of the granules. The electrical resistivity of most solid materials is a strong function of temperature, resistivity decreasing with increasing temperature.

Figure 2:
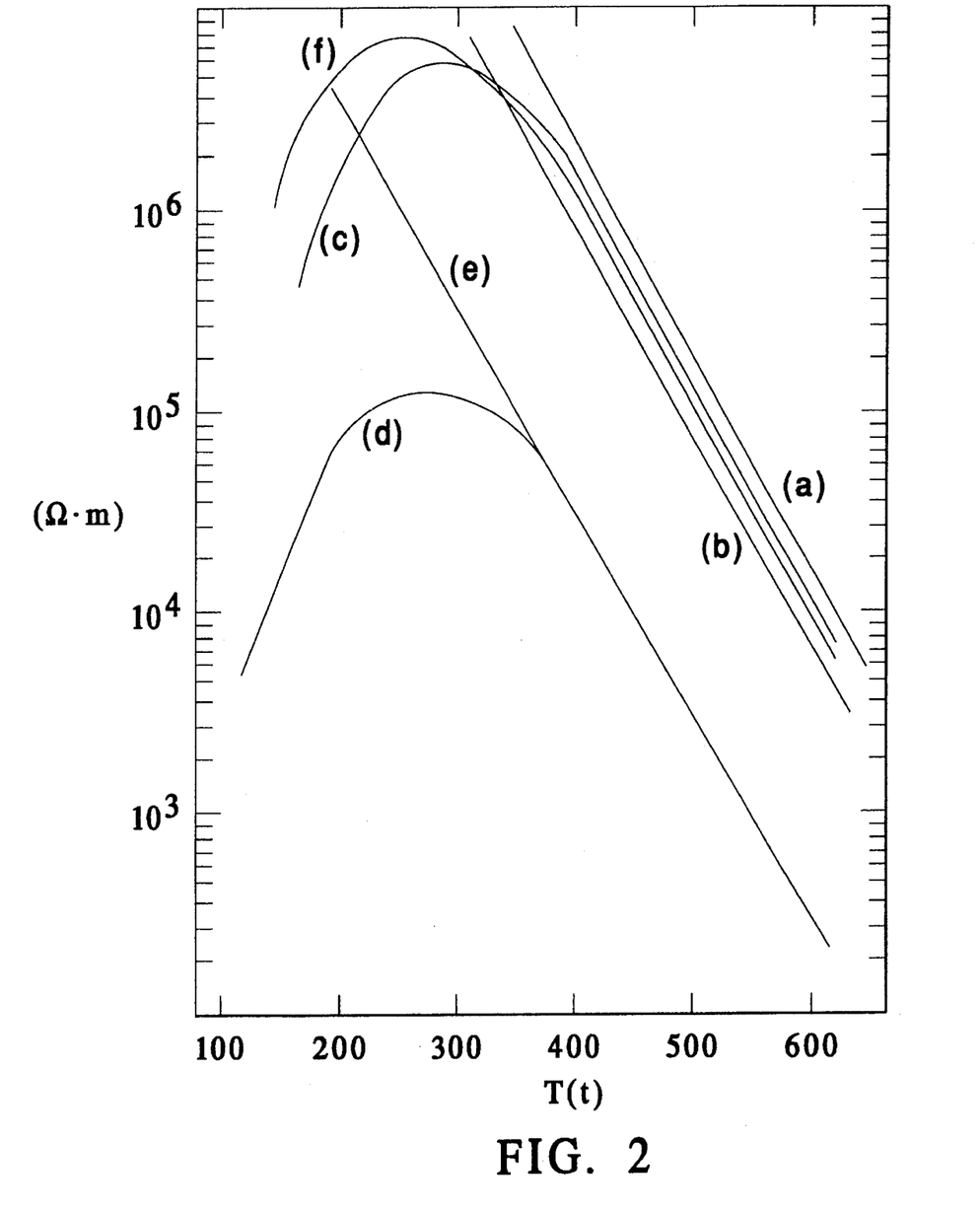
FIG. 2 is a plot of electrical resistivity vs. temperature for an EGB filter.

It would be expected that as clean granules accumulate sodium sulfate dust, the bulk electrical resistivity of the filtration bed would decrease. FIG. 2 is a plot of electrical resistivity as a function of temperature. Line (a) is representative of a typical granule used in EGB filter system. As can be seen, resistivity strongly decreases with increasing temperature, but is above the critical point of $1 \times 10^6$ ohm-m for temperatures of 450° C. or less. Line (b) is representative of this same granule, but coated with sodium sulfate dust. As expected, the resistivity is reduced and now is above the critical resistivity for temperatures below about 400° C. These data are based on laboratory conditions, with samples heated in an oven.

In actual operation, the inventors have found that a quite different situation is encountered. Upon initial operation of the EGB filter system on glass furnace exhaust, for about the first 10–20 hours, data of line (c) are obtained. At higher temperatures, greater than about 450° C., the results are as expected. However, as temperature is decreased, the resistivity falls well below the expected values, and in fact decreases with decreasing temperature. This effect is typical of fossil fuel combustion exhaust gas streams which contain acid components. In this case, $SO_3$ is present and has the effect of exhibiting an acid dew point. That is, upon cooling the flue gas, at some temperature acid begins to condense onto solid surfaces. This is further aggravated by the fact that the sodium sulfate is very hygroscopic, even deliquescent, which serves to elevate the acid dew point temperature above that which would be exhibited for acid condensation onto clean inert surfaces. When the acid dew point is reached, acid condensation occurs which provides a new electrical conduction mechanism. This conduction has a different dependence on temperature, thus the shape of line (c). Even with this acid dew point effect, the EGB filter technology can function, so long as temperatures are maintained in a proper range where resistivity is above $10^6$ ohm-m.

Figure 3A:
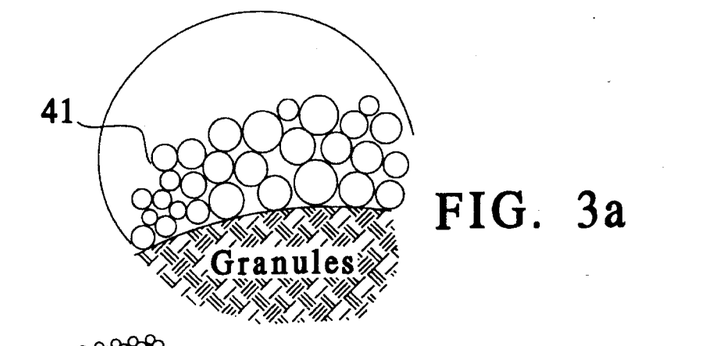
FIG. 3 is an illustration of granules coated with sodium sulfate.
Figure 3B:
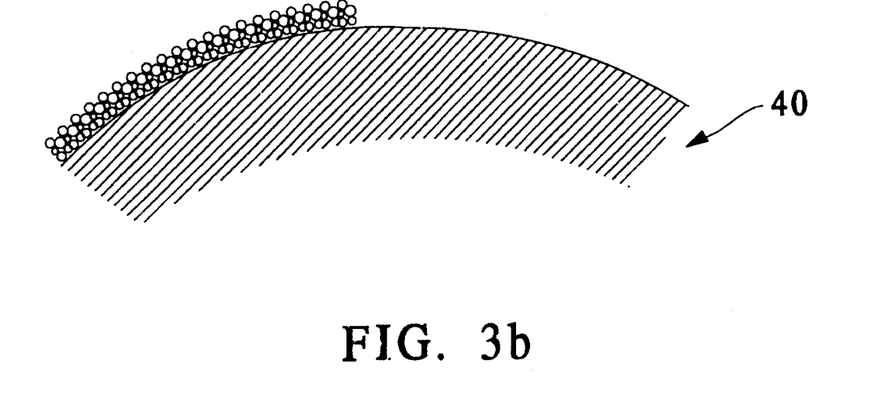
Figure 4:
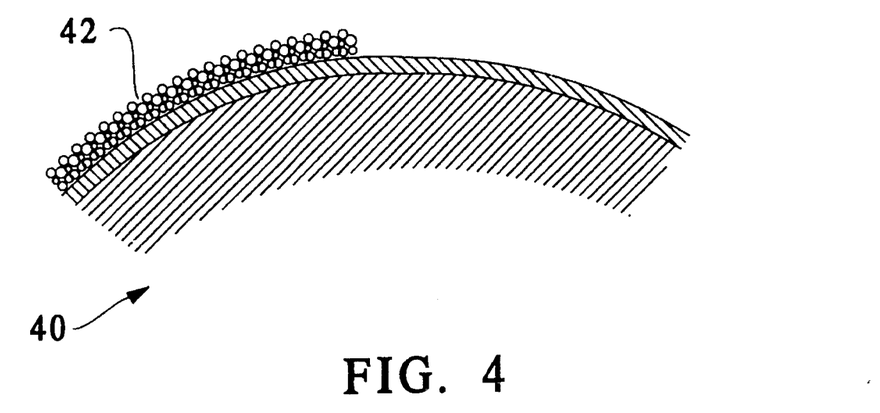
FIG. 4 is an illustration of granules coated with a layer of sodium sulfate.

However, upon extended operation, for example after several days of operation, some quite unexpected results are found. The resistivity curve of the bed has now shifted from curve (c) to curve (d). The most important difference is that at temperatures above the region of acid dew point, the resistivity is some 20 times less than that exhibited by the bed during its initial operation. Analysis reveals that the cause is a change in the physical structure of the sodium sulfate dust on the granule surface. Initially, the granule 40 is coated with sodium sulfate dust in the form of a particulate layer 41 as depicted in FIG. 3. Here the main path of flow of electric current is through the layer of dust on the granule. After the same granule is removed from the filter, cleaned of free dust, and returned to the filter several times, a solid layer of sodium sulfate 42 forms on the granule surface, as depicted in FIG. 4. It can be theoretically demonstrated that such a solid layer exhibits electrical resistivity some 10–100 times lower than for a particulate layer of the same material. Simply stated, in the particulate layer, the electric current is forced to flow through numerous constrictions at the particle contact points, which increases the electrical resistivity compared to a solid layer. The actual size of the contact points between particles determines the actual value of the resistivity compared to that for the solid layer.

Conventional EGB filter systems installed on glass melting furnaces have failed due to the above described effect. The initial electrical resistivity of the bed is in the acceptable range greater than $1 \times 10^6$ ohm-m, but after extended operation, the resistivity falls well below the acceptable value. Granules of such prior art processes removed from the operating filter and measured in the laboratory exhibit a resistivity curve as shown by (e). In the laboratory, tests are performed under essential dry-acid free ambient air conditions, so the acid dew point effect is not present. These tests reveal that simply cooling the sample to temperatures below about 250° C. brings the resistivity into the acceptable range. Attempts to achieve acceptable filter operation by gas cooling, as would be suggested by these tests, would fail, due to the effect acid dew point has on resistivity at these lower temperatures.

The inclusion of the prereactor bed 12 in the system, utilizing for example calcium-based sorbent powder, results in successful operation of the electrostatic bed filter 18. By co-mingling the granules between two beds, the solid coating on the granules is a mixture of $CaSO_4$ and $Na_2SO_4$. The electrical resistivity of $CaSO_3$ and $CaSO_4$ is several orders of magnitude greater than $Na_2SO_4$. The resistivity of the granules coated with a solid layer of the mixture is shown as curve (f) in FIG. 2. It can be seen that a workable region of temperatures exists where resistivity is greater than $1 \times 10^8$ ohm-m.

The invention has the added benefit that $SO_2$ reduction can be quite effectively achieved in the prereactor bed. Although conventional technology exists for reduction of $SO_2$ by dry injection of lime into flue gases, the use of the moving bed prereactor substantially improves the effectiveness of the process, i.e., both improved $SO_2$ reduction and reduced lime injections requirements. The effect of the prereactor bed is to provide excellent gas/solid contact and extended residence time of lime in contact with the flue gas. HCl and HF gases are also effectively reduced with this technology.

In a second preferred embodiment, the EGB filter granules, rather than being the above-described durable granules well known in EGB filter technology comprise a suitable alkaline earth metal sorbent. In this second embodiment, the need for a prereactor is eliminated since the granules themselves supply the alkaline earth metal materials necessary for reaction with $SO_3$ and $SO_2$ in the flue gas.

Examples of alkaline earth metal materials suitable for forming the bed granules are the same as those mentioned above in connection with the air-injected dust or powder for the prereactor. These include CaO, $Ca(OH)_2$, $CaCO_3$, MgO, $Mg(OH)_2$, $MgCO_3$, etc. The only limitations on the types of alkaline earth metal materials are that they be capable of forming granules and that they are sufficiently reactive to remove at least a large portion of the sulfur containing gases from the exhaust gases.

The granules are obtained either in a mined natural form, such as limestone ($CaCO_3$) or a manufactured agglomerate. The granules can be produced by well known processes, such as pelletizing powdered alkaline earth metal materials, together with binders and fillers such as silica sand (for strength). Another useful process is briquetting, which involves molding and compressing powdered alkaline earth metal materials with binders and fillers.

As with the first embodiment, the appropriate size of the granules for the second embodiment can be readily ascertained by one skilled in the art. For the second embodiment, the preferred size for the granules is from about 2.0 mm to about 20 mm and preferably from about 4.0 to about 10.0 mm.

Figure 5:
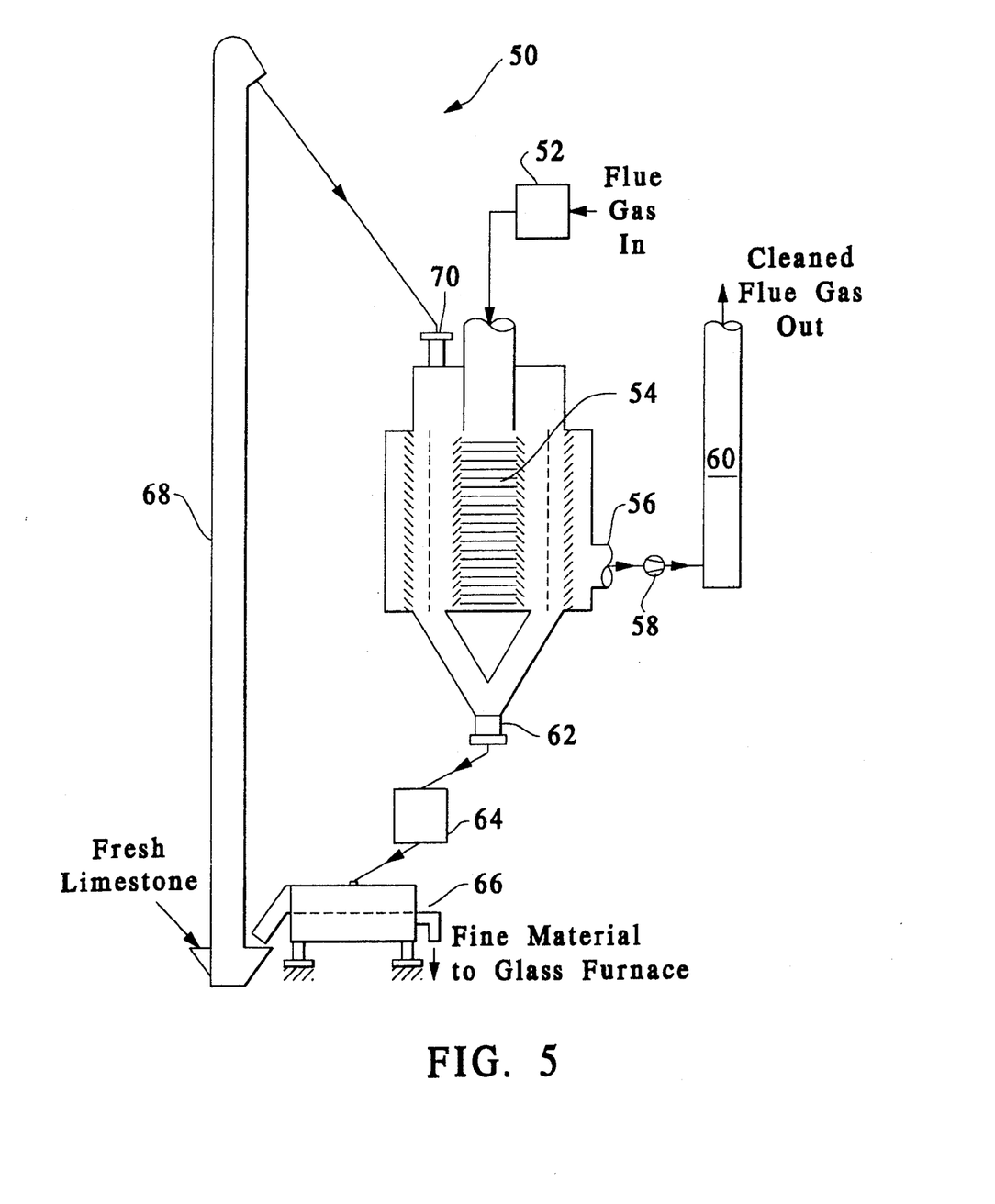
FIG. 5 is a schematic view of a second embodiment of the invention.

An apparatus suitable for use in this second embodiment is shown in FIG. 5. The apparatus, indicated generally by the number 50, includes an electrostatic preionizer 52 of conventional design where the entrained dust particles are given an electrostatic charge. Gases are then directed to the electrostatic granular bed filter 54, again of conventional design as exemplified by U.S. Pat. No. 4,338,113 which is herein incorporated by reference in its entirety. Dust particles are electrostatically deposited onto the granules which fill the filter. Simultaneously, $SO_2$ and $SO_3$ gases are chemically reacted with the alkaline earth metal material to form solid sulfate and sulfite salt, and to release gaseous $CO_2$. Cleaned gases leave the filter at exit 56 and a fan 58 is used to provide the underpressure to draw the gases through the previously mentioned equipment. Gases then exit to the atmosphere through the stack 60.

Granules with attached dust particles are removed, either periodically or continuously, from the EGB filter 54 at its bottom outlet 62. Granules are directed to a means of mechanical agitation 64 sufficient to dislodge the alkali metal salts (e.g., $Na_2SO_4$ dust) and reaction product alkaline earth metal sulfate (e.g., $CaSO_4$). Exemplary of well known mechanical agitation types useful in the invention include:

1. Tumbling mills where granular material is tumbled inside a rotating drum and impurities are dislodged by mechanical impact onto the drum walls and other granules.
2. Fluidized beds where granular material is put into a fluidized state by passing air vertically upward through a bed, and impurities are dislodged by mechanical impact between the granules.
3. Rotary abraders where granules are dropped into rotating wheel blades and are thrown at high velocity against the casing walls, where impurities are dislodged.
4. High velocity air jets, where granules are entrained into a high velocity air stream and are then impacted onto solid surfaces where impurities are dislodged.

After the impurities are mechanically dislodged from the granules, the mixture is directed to a suitable classifier 46 where the fine material, typically less than 1 mm diameter, is separated from the granules, via a vibrating screen or equivalent. The granules, which now exhibit freshly exposed surfaces of alkaline earth metal material, are conveyed via transport means, such as a bucket elevator 68, to the top of the filter 54 where they are reintroduced through inlet 70. Fresh alkaline earth metal material is added to the filter as required to make up for material lost in the agitation and screening steps. Fine sulfate salts (e.g. $NaSO_4$ and $CaSO_4$), and alkaline earth metal material from the classifier 66 are directed to the glass melting furnace where it is included in the batch materials. This is only possible if the granular material chosen for the filter is compatible with the glass batch ingredients. Limestone, for example, is suitable for use with most soda-lime glass types.

Figure 6:
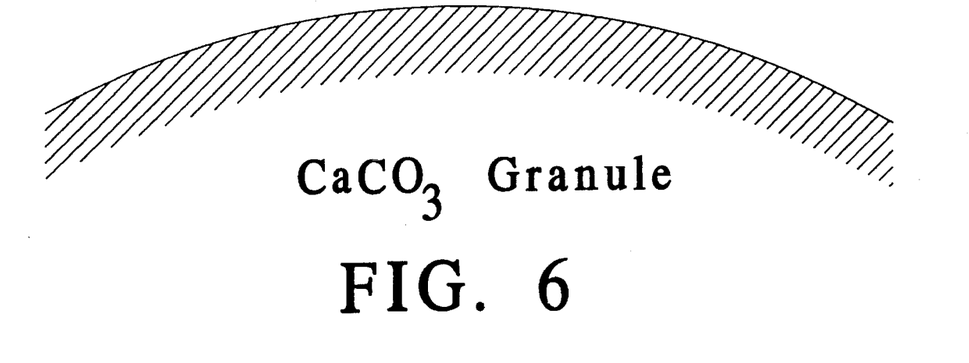
FIGS. 6–8 are illustrations of calcium carbonate granules uncoated and coated with sodium sulfate and calcium sulfate.
Figure 7:
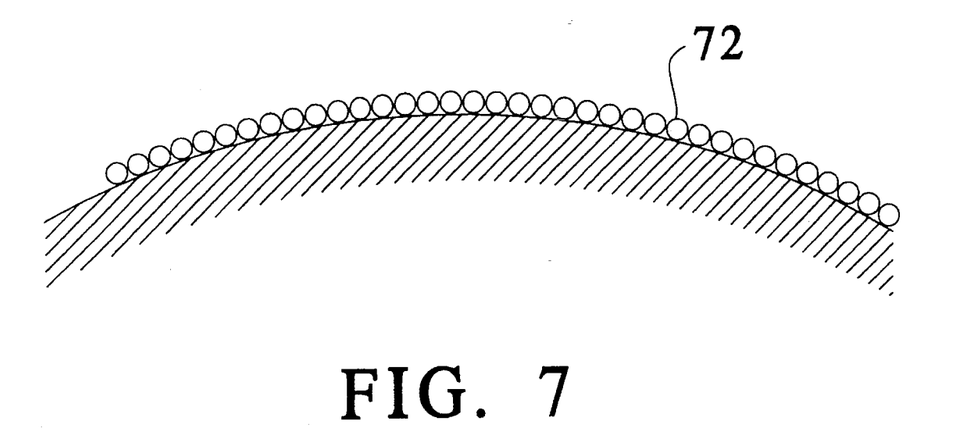
Figure 8:
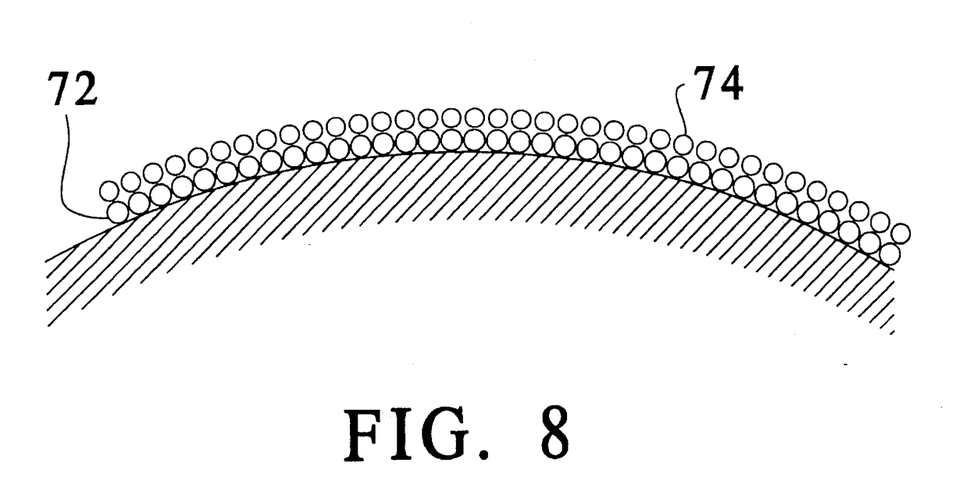

The apparatus of FIG. 5 is effective at preventing the development of a continuous solid layer of alkali metal salts (e.g., $NaSO_4$) on the granules. This phenomenon can be seen most clearly with reference to FIGS. 6–8. FIG. 6 shows the surface of a fresh granule of an alkaline earth metal material such as $CaCO_3$. As shown in FIG. 7, after exposure to exhaust gases containing $SO_2$ and $SO_3$, a reaction product layer of $CaSO_4$ 72 is formed. This layer 72 has a higher molar volume than $CaCO_3$ (typically 1.5 times higher). As a result, the reaction product layer 72 is loosely adhered to the granule surface. Subsequently, $Na_2SO_4$ and/or other alkali metal salts 74 in dust form are deposited on top of this loosely adhered reaction product, as shown in FIG. 8. The combined layer is then easily removed by the mechanical agitation and a fresh substrate of $CaCO_3$ is exposed.

The mechanical cleaning also exposes fresh sorbent surface on the alkaline earth metal material, which is then once again reactive with the $SO_2$ and $SO_3$ in the exhaust gases. Thus the process has the added benefit of being effective at reduction of these gaseous pollutants in the exhaust gases. The alkaline earth metal material is also reactive with HF and HCl gases and their reduction can also be achieved.

Although the present invention has been described in connection with preferred embodiments of the invention, it will be appreciated by those skilled in the art that additions, substitutions, modifications and deletions not specifically described, may be made without departing from the spirit and scope of the invention as defined in the appended claims.

What is claimed is:

1. A method for reducing pollution emissions from a glass melting furnace exhaust gas stream which includes a gaseous sulfur oxide constituent and alkali metal salt particles, comprising the steps of:

(a) injecting an alkaline earth metal containing sorbent dust or powder into a glass melting furnace exhaust gas stream containing polluting substances including sulfur compounds and alkali metal salts;

(b) passing the exhaust gases from step (a) over a moving prereactor bed of first granules, wherein said alkaline earth metal-containing dust reacts with said sulfur compounds in the exhaust gases to form alkaline earth metal sulfite and sulfate salts, said salts being deposited on the granules in said moving bed and forming a layer of alkaline earth metal salts on said first granules in said moving bed;

(c) electrostatically ionizing the exhaust gases exiting the moving bed from step (b);

(d) passing the ionized exhaust gases over an electrostatic granular bed filter containing polarized second granules;

(e) precipitating alkali metal salts on said polarized granules and depositing a layer of alkali metal salts on said second granules, thereby providing substantial reduction of sulfur and alkali metal salt precipitates in said exhaust stream;

(f) periodically removing said first granules from said prereactor and second granules from said electrostatic granular bed filter, and mixing said first and second granules, thereby forming a mixture of granules containing alkaline earth metal salts and alkali metal salts; and (g) returning said mixed granules to said prereactor bed and said electrostatic granular bed filter.

2. A method according to claim 1, where said alkaline earth metal-containing sorbent dust is selected from the group consisting of $CaCO_3$, $CaO$, $Ca(OH)_2$, $MgCO_3$, $MgO$, $Mg(OH)_2$, and mixtures thereof.

3. A method according to claim 1, where said prereactor comprises a circular vertically arranged cylinder and alkaline earth metal-based sorbent dust is injected into the interior region of said cylinder.

4. A method according to claim 1, where only a portion of the exhaust gases are passed through the prereactor bed.

5. A method according to claim 1, wherein the prereactor bed is from about 0.1 to about 0.3 meters thick and said bed of polarized second granules is from about 0.5 to about 1.0 meters thick.

6. A method according to claim 1, wherein granule migration velocity in the first moving bed is from about 10 to about 100 meters/hr and the granule migration velocity in the second electrostatic polarized bed is from about 0.2 to about 2 meters/hr.

\* \* \* \* \*